US011739746B2

(12) United States Patent
Lindeman et al.

(10) Patent No.: US 11,739,746 B2
(45) Date of Patent: Aug. 29, 2023

(54) MOUNTING POCKET FOR REMOTE EQUIPMENT MONITORING DEVICE

(71) Applicant: Cornell Pump Company, Clackamas, OR (US)

(72) Inventors: Adam Lindeman, Portland, OR (US); Erick Johnson, Gresham, OR (US); Colin O'Callaghan, Portland, OR (US); Andrew Enterline, Troutdale, OR (US)

(73) Assignee: CORNELL PUMP COMPANY LLC, Wilmington, DE (US)

( * ) Notice: Subject to any disclaimer, the term of this patent is extended or adjusted under 35 U.S.C. 154(b) by 0 days.

(21) Appl. No.: 17/476,037

(22) Filed: Sep. 15, 2021

(65) Prior Publication Data

US 2022/0099086 A1    Mar. 31, 2022

Related U.S. Application Data (60) Provisional application No. 63/083,158, filed on Sep. 25, 2020.

(51) Int. Cl.
| | | |
|---|---|---|
| *F04B 51/00* | (2006.01) | |
| *G01H 1/00* | (2006.01) | |
| *G01K 13/00* | (2021.01) | |

(52) U.S. Cl.
CPC ............. *F04B 51/00* (2013.01); *G01H 1/00* (2013.01); *G01K 13/00* (2013.01)

(58) Field of Classification Search
CPC ......... F04B 51/00; F04B 53/002; G01H 1/00; G01H 1/003; G01H 1/006; G01K 13/00;
(Continued)

(56) References Cited

U.S. PATENT DOCUMENTS 6,527,517 B1    3/2003    Wallrafen et al.
6,607,260 B1    8/2003    Fong
(Continued)

FOREIGN PATENT DOCUMENTS

CN          1401971    *   3/2003    ............ F16C 41/008
CN       201352126 Y        11/2009
(Continued)

OTHER PUBLICATIONS

International Search Report and Written Opinion issued in corresponding International Application No. PCT/US2021/050464 dated Dec. 10, 2021, 12 pages.

*Primary Examiner* — Son T Le
*Assistant Examiner* — Matthew W. Baca
(74) *Attorney, Agent, or Firm* — Snyder, Clark, Lesch & Chung, LLP (57) ABSTRACT

A mounting pocket is provided for attaching a monitoring device to a pump bearing frame. The mounting pocket includes a recessed area located on an external side of the pump bearing frame, a flat surface within the recessed area; and at least four threaded mounting holes extending into the flat surface. At least a part of the drive bearing portion has a reduced radial wall thickness adjacent the flat surface. The threaded mounting holes are configured to receive threaded bolts from the monitoring device to secure the flat surface against a rear surface of the monitoring device. The flat surface is configured to transfer at least one of vibration or thermal energy from the pump bearing frame through the flat surface to the monitoring device.

16 Claims, 7 Drawing Sheets

(58) Field of Classification Search
CPC ... G01K 1/14; G01K 1/08; G01K 1/16; F04D 13/0686; F04D 15/0088; F04D 15/0094; F04D 29/406; F05D 2230/21; F05D 2270/303; F05D 2270/3032; F05D 2270/334; F05D 2270/80; F05D 2270/807
USPC .......................................................... 73/168
See application file for complete search history.

(56) References Cited

U.S. PATENT DOCUMENTS

| | | | |
|---|---|---|---|
| 6,845,664 | B1 | 1/2005 | Okojie |
| 9,791,310 | B2 | 10/2017 | Girardeau |
| 10,422,667 | B2 | 9/2019 | DeCook et al. |
| 2003/0030565 | A1* | 2/2003 | Sakatani ............. G01M 13/045 340/682 |
| 2008/0234964 | A1* | 9/2008 | Miyasaka ............. G01M 13/04 702/113 |
| 2009/0229455 | A1* | 9/2009 | Eichner ................. F04B 49/065 91/1 |
| 2013/0099931 | A1 | 4/2013 | Wetherill et al. |
| 2016/0161299 | A1* | 6/2016 | Campbell ............ F16C 19/527 73/431 |
| 2020/0018306 | A1* | 1/2020 | Leach .................. G05D 7/0676 |
| 2021/0181063 | A1* | 6/2021 | Dodani ............... B60C 23/0493 |
| 2021/0325920 | A1* | 10/2021 | Peled ..................... G01K 13/08 |

FOREIGN PATENT DOCUMENTS

| | | |
|---|---|---|
| CN | 203175995 U | 9/2013 |
| CN | 104165138 B | 9/2016 |
| CN | 206540562 U | 10/2017 |
| CN | 109587650 A | 4/2019 |
| CN | 21015460 U | 3/2020 |
| CN | 210210202 U | 3/2020 |
| DE | 102009005154 A1 | 7/2010 |
| EP | 3388798 A1 | 10/2018 |

* cited by examiner

SECTION A-A

SECTION B-B

MOUNTING POCKET FOR REMOTE EQUIPMENT MONITORING DEVICE

CROSS-REFERENCE TO RELATED APPLICATION

This application claims priority to under 35 U.S.C. § 119, based on U.S. Provisional Patent Application No. 63/083,158 filed Sep. 25, 2020, titled "Mounting Pocket for Remote Equipment Monitoring Device," the disclosure of which is hereby incorporated by reference.

BACKGROUND OF THE INVENTION

Equipment monitoring systems give pump users the ability to monitor pump parameters remotely. In some instances, a monitoring device may be provided as a single unit that can be attached to an outside surface of the pump and detect pump characteristics, such as vibration, temperature, and pump location.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Monitoring devices configured for direct physical attachment (e.g., as a single unit) to pump equipment provide a convenient way to obtain monitoring data for new and retrofit pump applications. The monitoring device may support monitoring of internal vibration, temperature, and/or location sensors, along with data uploading over a wireless network. In one implementation, the monitoring device may be an industrial internet-of-things (IIoT) device. A secure mechanical coupling between the pump bearing frame and the monitoring device is needed to provide heat transfer (e.g., for temperature sensing) and mechanical contact (e.g., for vibration sensing), among other factors.

Monitoring devices for pumps may be configured with various features (e.g., sensors, processors, software, communication interfaces, etc.), which may need to be upgraded or replaced over time. Thus, the monitoring devices may be equipped with a housing to accommodate new or different configurations. Additionally, it may be desirable to change out a monitoring device with another monitoring device having the same or different features. For reasons such as cost-control and uniformity, it is also preferable to use a single monitoring device for pumps of different types and sizes.

Given the above design constraints for monitoring devices, the minimum housing dimensions for the monitoring devices may be larger than dimensions that might be possible for customized devices or devices for specific purposes. Accordingly, dimensions for a mounting surface on the pump bearing frame may also be substantially larger than the mounting surface for other types of IoT devices. Furthermore, a flat mounting surface is needed to provide optimal heat transfer and mechanical vibrations to sensors in the monitoring device.

According to one implementation, a mounting surface on a pump bearing frame requires a substantially flat surface of at least 3 inches (7.62 cm) by 3 inches (7.62 cm), and preferably about 3.5 inches by 3.5 inches (8.89 cm by 8.89 cm), to accommodate a multi-purpose monitoring device. The flat surface is preferably located over (or adjacent to) the area of pump bearing frame that is configured to house the drive end bearings, where the most impactful temperature- and vibration-related events for a pump are likely to occur. The monitoring device may be mounted on the flat surface using mechanical fasteners, such as screws, which require tapped holes in the pump bearing frame.

According to an implementation described herein, a system is provided for securing a remote monitoring device to a pump bearing frame. The monitoring device is configured to be mounted to rotating equipment and collect vibration and temperature data from the equipment. The pump bearing frame includes a mounting pocket for the monitoring device. The mounting pocket includes a recessed area located on an outside of the pump bearing frame; a flat surface within the recessed area; and at least four threaded mounting holes extending into the flat surface. The at least four threaded mounting holes are arranged in a hole pattern that corresponds to a bolt pattern of the monitoring device. The threaded mounting holes are configured to receive threaded bolts from the monitoring device to secure the flat surface against a rear surface of the monitoring device. The flat surface is configured to transfer at least one of vibration or thermal energy from the pump bearing frame through the flat surface to the monitoring device.

Figure 1:
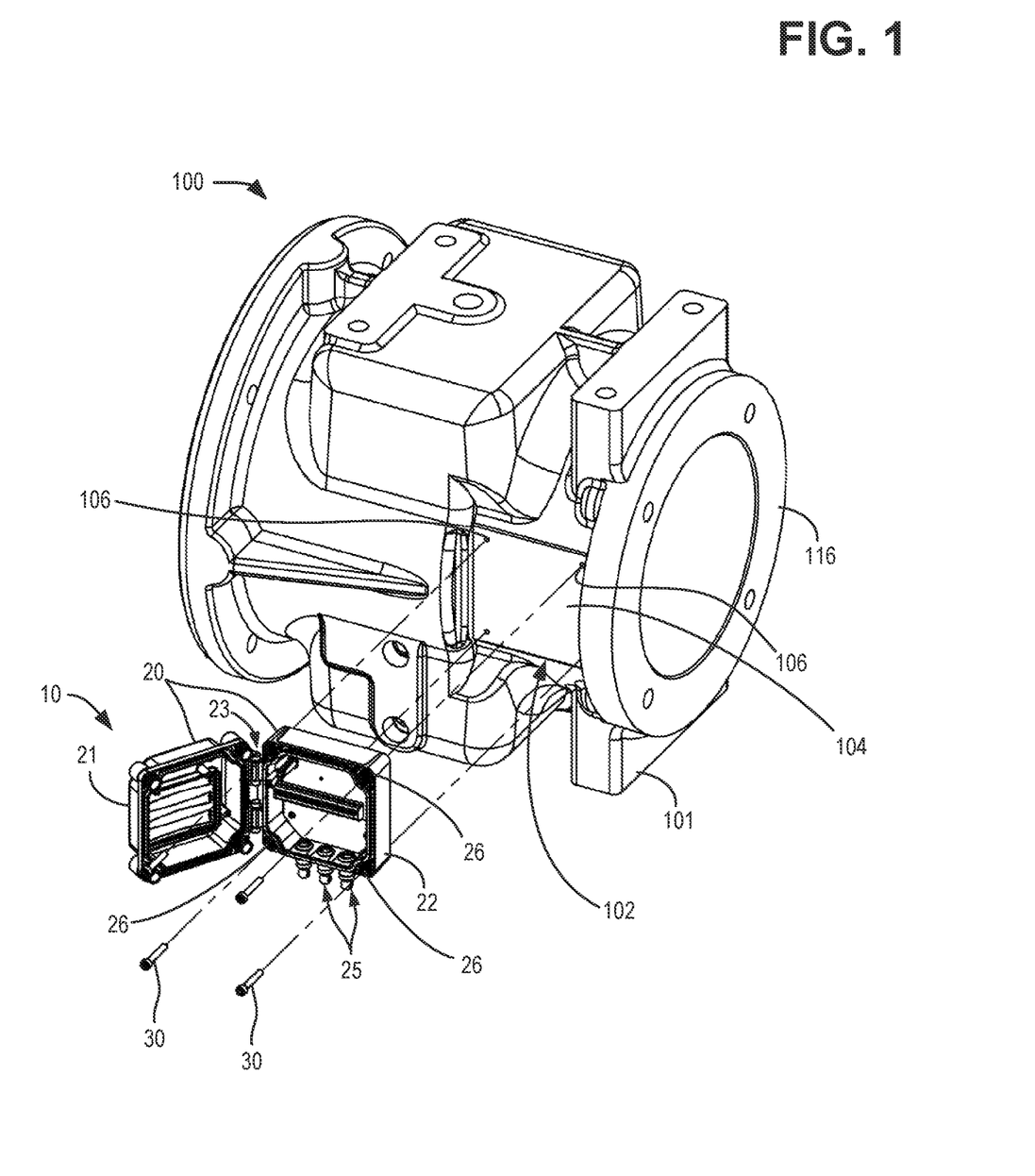
FIG. 1 is a diagram of an assembly view of a pump bearing frame with a pocket configured to receive a monitoring device, according to an implementation.
Figure 2:
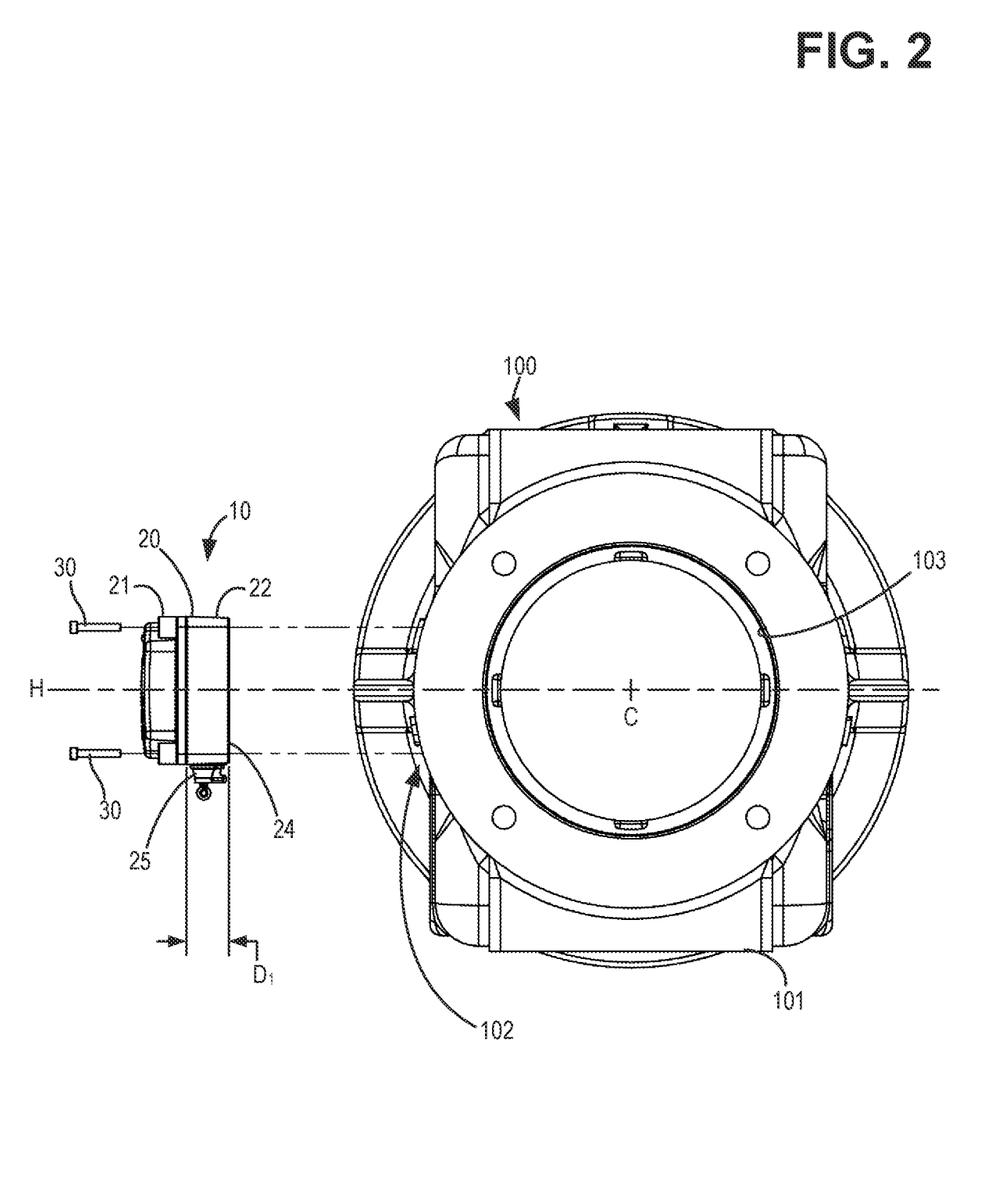
FIG. 2 is a schematic exploded front view of the pump bearing frame and monitoring device of FIG. 1.
Figure 3:
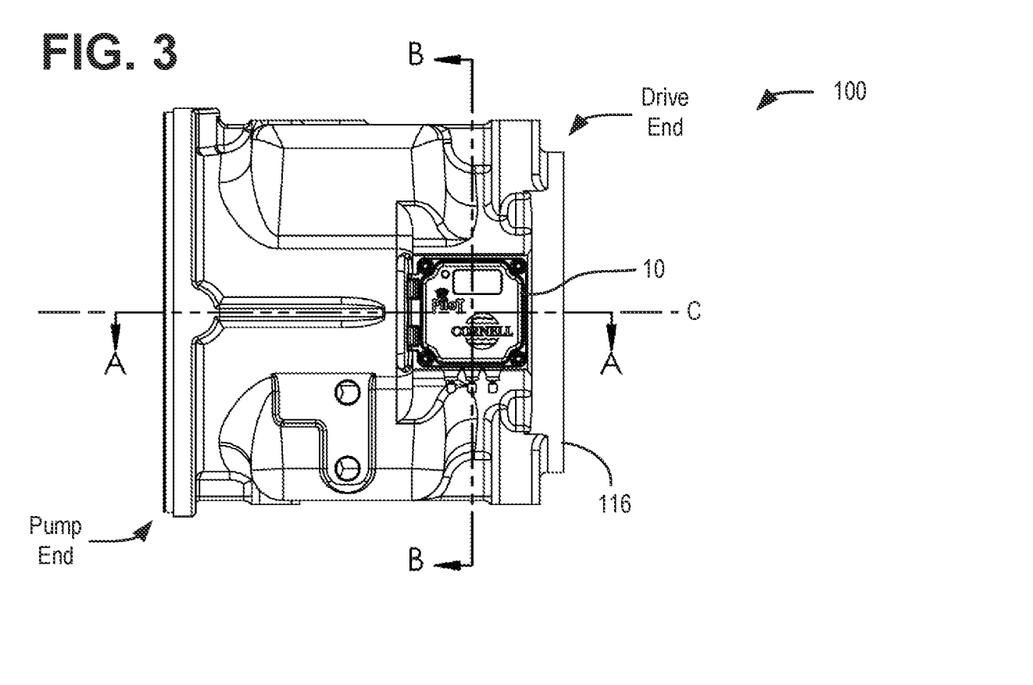
FIG. 3 is a side view of the pump bearing frame of FIG. 1 with the monitoring device installed.
Figure 4:
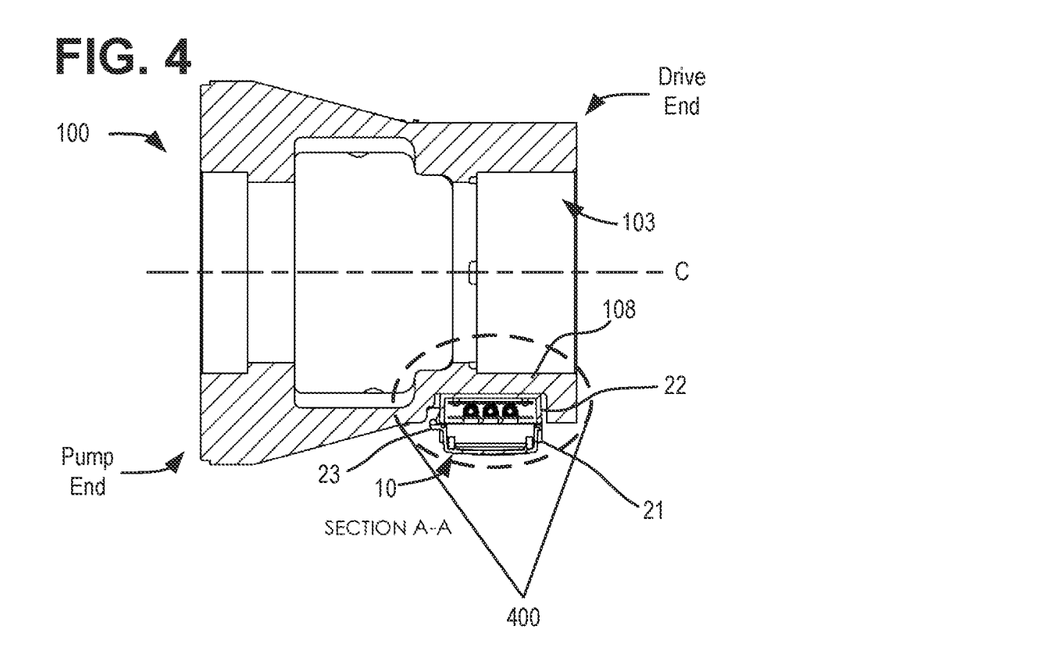
FIG. 4 is a top cross-sectional view of the pump bearing frame and monitoring device of FIG. 3.
Figure 5:
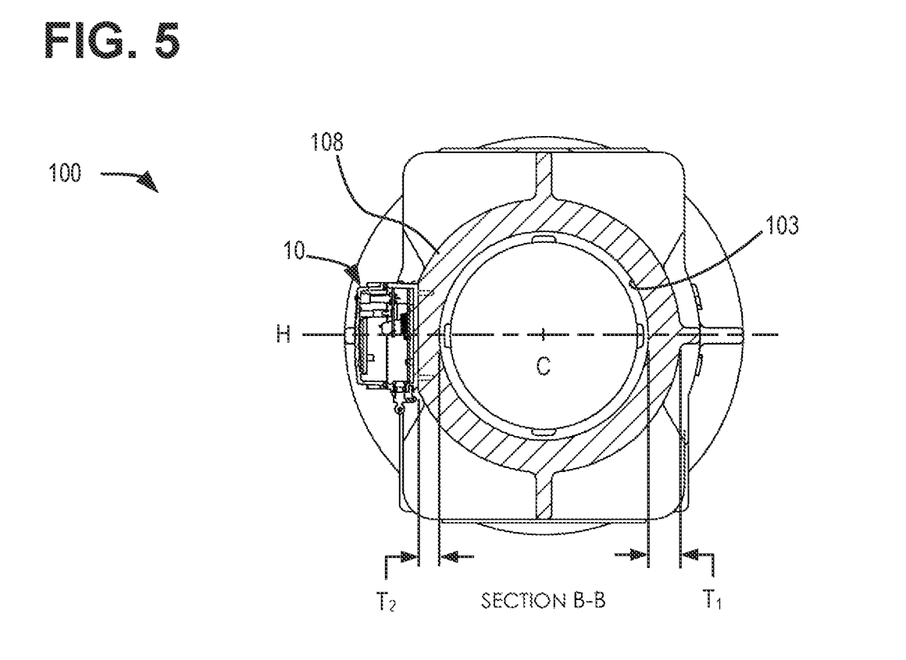
FIG. 5 is a front cross-sectional view of the pump bearing frame and monitoring device of FIG. 3.

FIG. 1 is a diagram of an assembly view of a monitoring device 10 with pump bearing frame 100, according to an implementation described herein. FIG. 2 is a schematic exploded front view of monitoring device 10 and pump bearing frame 100. FIG. 3 is a side view of the pump bearing frame 100 with monitoring device 10 installed. FIG. 4 is a top cross-sectional view of the pump bearing frame 100 and monitoring device 10 along section A-A (which extends through centerline C) of FIG. 3. FIG. 5 is a front cross-sectional view of the pump bearing frame 100 and monitoring device 10 along section B-B of FIG. 3. Referring collectively to FIGS. 1-5, monitoring device 10 may be attached to a machined mounting pocket 102 of pump bearing frame 100.

Monitoring device 10 may include a housing 20 configured for physical attachment, as a single unit, to a mounting surface on the outside of pump bearing frame 100. Monitoring device 10 may include an Internet of Things device (e.g., an IIoT device), a Machine Type Communication (MTC) device, a machine-to-machine (M2M) device, an enhanced MTC device (eMTC) (also known as Cat-M1), an end node employing Low Power Wide Area (LPWA) technology such as Narrow Band (NB) IoT (NB-IoT) technology, or some other type of wireless end node. According to various exemplary embodiments, monitoring device 10 may include within housing 20 hardware, such as a processor, application-specific integrated circuit (ASIC), a field-programmable gate array (FPGA), or a combination of hardware and software (e.g., a processor executing software) to execute various types of functions. Monitoring device 10 may also include calibrated sensors within housing 20 to collect vibration, temperature, and/or other pump data, and forward the collected data via a wireless interface (not shown) for access by users.

According to an implementation, monitoring device 10 may include a vibration sensor with accelerometers, signal amplifiers, and filters to detect and indicate sensed vibration in different directions. For example, the vibration sensors may include a set of three accelerometers to measure vibration along three respective axes (e.g., x-, y-, and z-axes). According to one embodiment, the accelerometer may output a voltage proportional to the acceleration. The accuracy of the vibration sensors in monitoring device 10 can be affected by the location, orientation, and attachment of monitoring device 10 on pump bearing frame 100.

Monitoring device 10 may also include a temperature sensor to detect a temperature within housing 20 of monitoring device 10. The internal temperature of housing 20 may generally correspond to the temperature of pump bearing frame 100 at the point of attachment (e.g., within mounting pocket 102). For example, temperature changes of pump bearing frame 100 (e.g., in portions adjacent internal bearings) will typically cause proportional temperature changes in the housing 20 of monitoring device 10. In one implementation, the temperature sensor may output an analog voltage value as a voltage output representing a temperature (e.g., in degrees Fahrenheit or Celsius). The accuracy of the temperature sensor in monitoring device 10 can be affected by the location and attachment of monitoring device 10 on pump bearing frame 100.

Monitoring device 10 may also include an internal battery that supports monitoring of internal vibration, temperature, and/or location sensors, along with data uploading over a wireless network. In another implementation, monitoring device 10 may also include an external power port to provide continuous power and support additional monitoring of external sensors (e.g., flow sensors, other vibration sensor, other temperature sensors, etc.) through hard-wired sensor ports 25 of monitoring device 10. Ports 25 are shown with external dust/spray resistant covers.

In FIG. 1, monitoring device 10 is shown with partially open housing 20, according to an implementation. Housing 20 of monitoring device 10 may include a front cover 21 and a base portion 22 connected by a hinge 23. The material of front cover 21 and base portion 22 may be a polymer, such as a structurally rigid plastic material. In one implementation, housing 20 may provide a dust-resistant and water-spray resistant enclosure to protect internal components, such as vibration, temperature, and other sensors described above. In another implementation, housing 20 may meet one or more industrial standards for water-proof submersion. In one aspect, base portion 22 of housing 20 may include a set of four holes to receive four corresponding threaded mounting pins 30 therethrough, such that monitoring device 10 may be attached within mounting pocket 102 of pump bearing frame 100 via mounting pins 30.

Pump bearing frame 100 (also referred to as "monitored equipment frame") may include a housing for a pump, engine, electric motor, or any other piece of equipment (e.g., rotating equipment) that a user wishes to monitor using vibration, temperature, and other sensors. According to implementations described herein, pump bearing frame 100 may include a ferrous metal, such as steel, stainless steel, carbon steel, cast iron, etc. Pump bearing frame 100 may include mounting pocket 102 onto which monitoring device 10 may be attached. Mounting pocket 102 may have a flat, machined surface 104 (also referred to herein interchangeably as "flat surface 104" and "mounting surface 104") located, for example, adjacent the area of pump bearing frame 100 that is configured to house the drive end bearings. More particularly, as shown in FIG. 2, mounting pocket 102, and flat surface 104 in particular, may be located next to a substantially cylindrical drive bearing portion 103 on a horizontal centerline, H, that extends through an axis, C, of pump bearing frame 100. The horizontal centerline H may be defined relative to the orientation of pump bearing frame 100, such that horizontal centerline H is essentially parallel to a base 101 of pump bearing frame 100.

Mounting pocket 102 may include flat surface 104 with threaded mounting holes 106 at, for example, each corner of flat surface 104. Flat surface 104 may be configured to be orthogonal to horizontal centerline H, such that flat surface 104 may be in a vertical orientation on one side of pump bearing frame 100 when the pump bearing frame 100 is positioned on a horizontally-oriented base 101, as shown in FIG. 1 for example.

Mounting holes 106 may extend partially into a side wall 108 of pump bearing frame 100. A rear surface 24 (FIG. 2) of housing 20 may be mounted against flat surface 104. Flat surface 104 may match the flat (e.g., no contour) profile of rear surface 24 to maximize contacting surface area and to prevent bending/flexing of housing 20. Flat surface 104 may be substantially smooth (e.g., without protrusions or surface defects typically associated with sand casting) to ensure that rear surface 24 and flat surface 104 are flush when monitoring device is installed.

Mounting holes 106 in flat surface 104 may be configured to receive mounting pins 30 inserted through base portion 22 of monitoring device 10. Mounting holes 106 may be configured in a pattern to align with a pattern of holes 26 in monitoring device 10. Particularly, in the examples shown, four mounting holes 106, each distributed in a corner of flat surface 104, may be matched to four holes 26 of monitoring device 10. According to an implementation, at least four mounting holes 106 and corresponding mounting pins 30 (e.g., located near respective corners of flat surface 104) may be used to ensure vibration and thermal energies are effectively transmitted between flat surface 104 and monitoring device 10. In other implementations, other numbers of mounting holes 106 may be used (e.g., 5, 6, etc.).

The thickness of side wall 108 may be minimized to provide optimal and predictable heat transfer between bearings in pump bearing frame 100 and monitoring device 10, while providing sufficient structural integrity for pump bearing frame 100. At least a portion of drive bearing portion 103 has a reduced radial wall thickness adjacent flat surface 104, relative to the radial wall thickness on the opposite side of bearing portion 103, for example. As shown in FIG. 5, the minimum thickness, $T_2$, of side wall 108 may be along the horizontal centerline, H, behind mounting surface 104.

According to the implementation shown in FIG. 5, the minimum thickness, $T_2$, of side wall 108 behind mounting surface 104 may be about one-half of the standard wall thickness, $T_1$. For example, assuming $T_1$ is 1 inch (2.54 cm), T2 may be about 0.5 inches (1.27 cm). According to other implementations, side wall 108 may have a minimum thickness, $T_2$, of about 0.4 to 0.8 inches.

Mounting surface 104 may be configured to fit adjacent and flush against rear surface 24 of housing 20 when monitoring device 10 is attached to pump bearing frame 100. Housing 20 may be mechanically attached to mounting surface 104 by inserting pins 30 through holes 26 of base portion 22 and into mounting holes 106. When rear surface 24 is secured against mounting surface 104, sensors (e.g., vibration sensors, temperature sensors, etc.) in monitoring device 10 may detect pump indicators, such a vibration and temperature, though side wall 108 of pump bearing frame 100.

Figure 6:
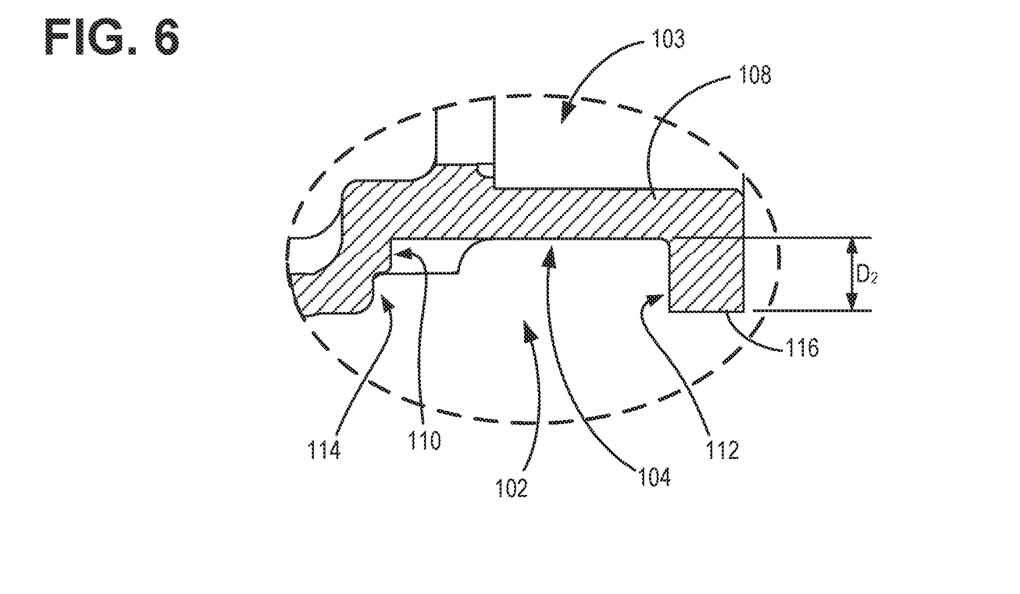
FIG. 6 is an enlarged cross-sectional view of a portion of the pump bearing frame.

FIG. 6 is an enlarged cross-sectional view of portion 400 of pump bearing frame 100 from FIG. 4. In FIG. 6, pump bearing frame portion 400 is shown without monitoring device 10 attached. As shown in FIG. 6, mounting surface 104 extends longitudinally between a pump-side wall 110 and a drive-side wall 112 of mounting pocket 102. Pump-side wall 110 and drive-side wall 112 may be formed, for example, by machining portions of the exterior of pump bearing frame 100 to create mounting surface 104. According to one implementation, drive-side wall 112 may be continuous with a back surface of drive end flange 116. The depth of drive-side wall 112 may vary relative to the radius of curvature of side wall 108. In one implementation, the maximum depth, $D_2$, of mounting pocket 102 may located along horizontal centerline, H (FIG. 2), and be approximately equal to, but not exceed, the depth, $D_1$ (FIG. 2), of base portion 22 of housing 20. Generally, the depth of mounting pocket 102 provides a reduced thickness, $T_2$ (FIG. 5), in side wall 108 to facilitate better heat transfer and reduces exposure of mounting device 10 to external contact. Mounting pocket 102 may be oriented such that mounting holes 106 are located outside the areas of reduced thickness, $T_2$.

Mounting pocket 102 includes a recess 114 at pump-side wall 110 of mounting pocket 102. As shown, for example, in FIGS. 4 and 6, recess 114 may be configured to accommodate hinge 23 when monitoring device 10 is attached to mounting surface 104. Recess 114 may also be configured to provide sufficient clearance to permit opening of front cover 21 when monitoring device 10 is attached to mounting surface 104. The configuration of recess 114 on only one side of mounting pocket 102 (e.g., the absence of a corresponding recess on drive-side wall 112) acts as an indexing mechanism for monitoring device 10 in mounting pocket 102 and helps to ensure monitoring device 10 is installed in a correct orientation relative to pump bearing frame 100 (e.g., with ports 25 facing downward). The correct orientation of monitoring device 10 is necessary to provide accurate readings from, for example, a 3-axis accelerometer used to detect vibration.

Figure 7:
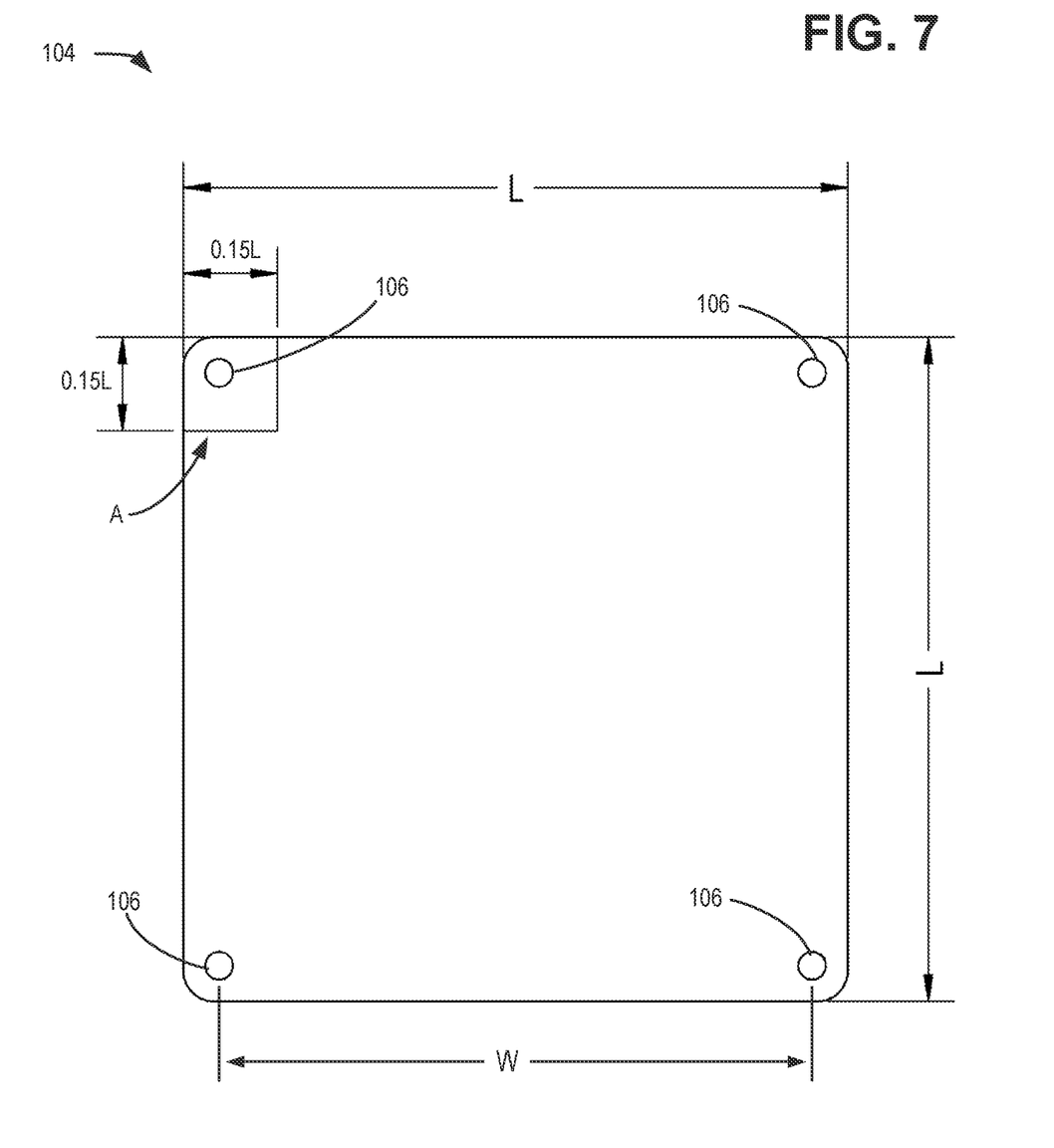
FIG. 7 is a side view of the mounting surface of FIG. 1.
Figure 8A:
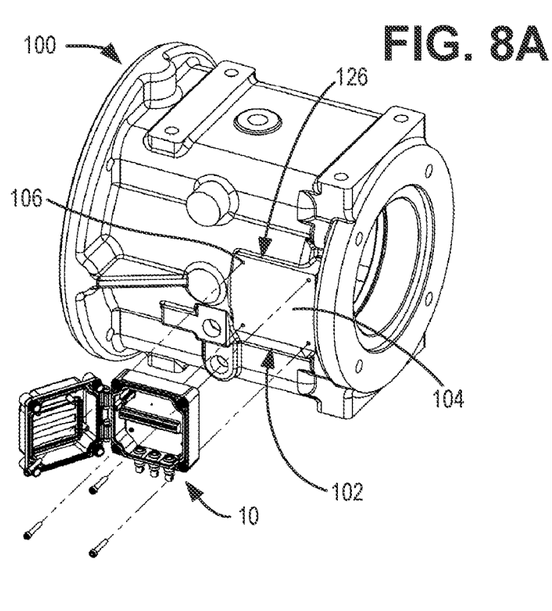
FIG. 8A is an assembly view of a pump bearing frame with a pocket configured to receive a monitoring device, according to another implementation.
Figure 8B:
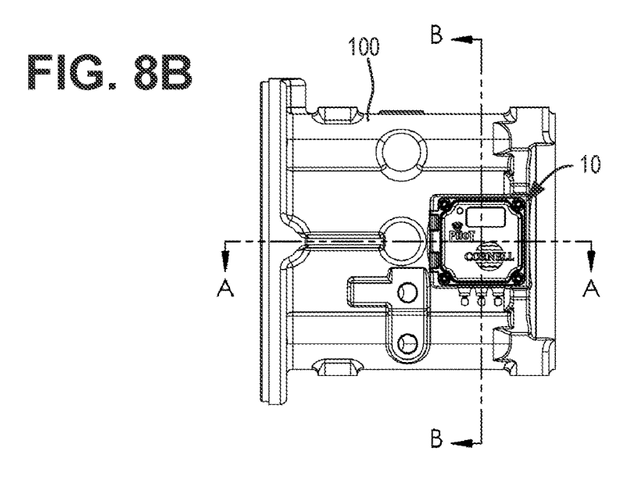
FIG. 8B is a side view of the pump bearing frame of FIG. 8A with the monitoring device installed.
Figure 8C:
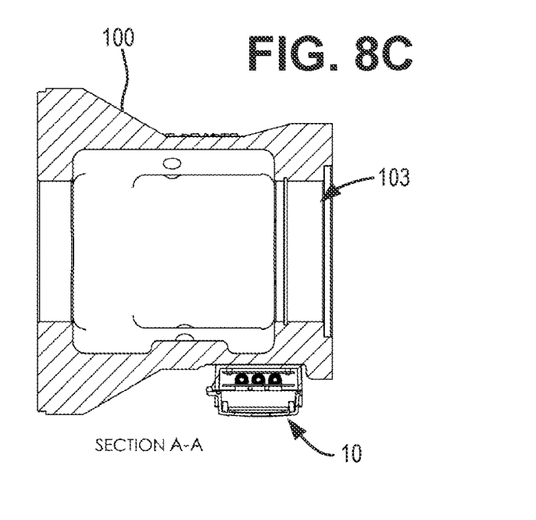
FIG. 8C is a top cross-sectional view of the pump bearing frame and monitoring device of FIG. 8B.
Figure 8D:
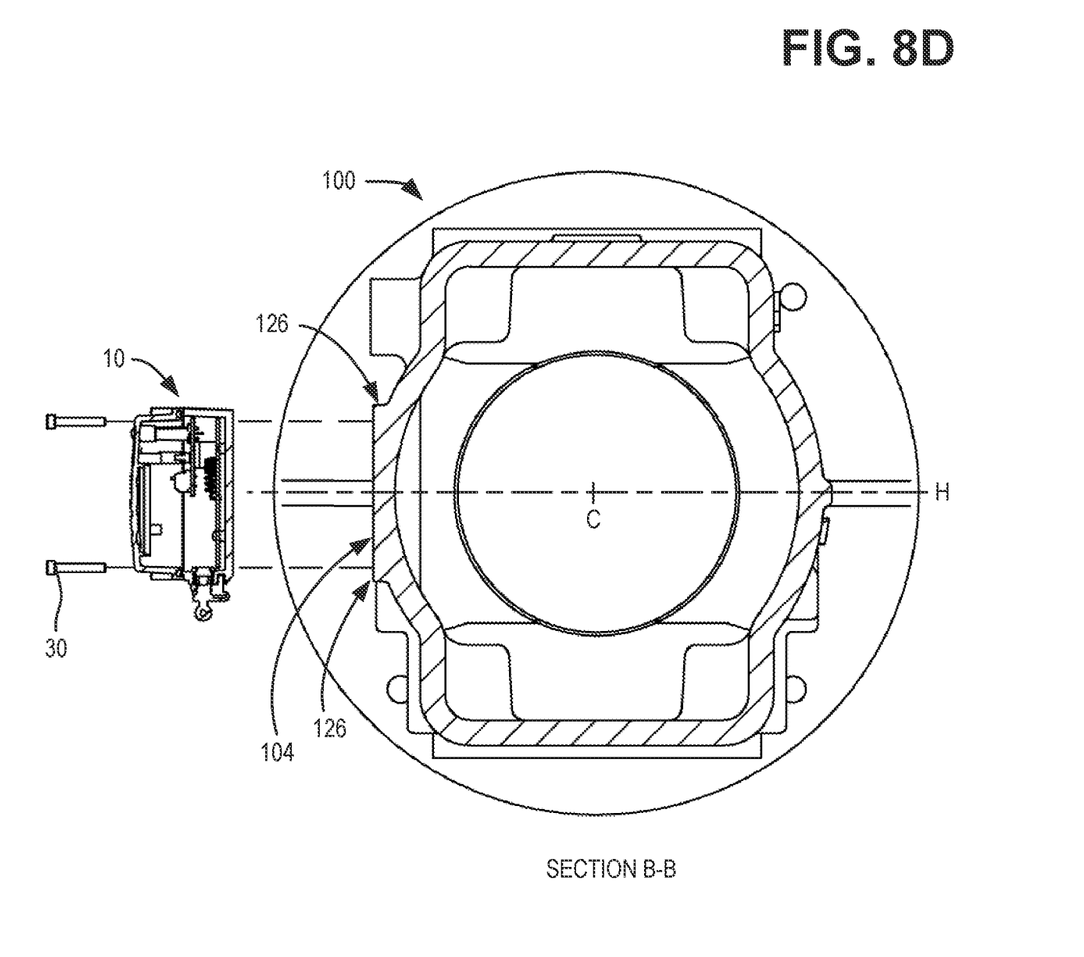
FIG. 8D is an exploded front cross-sectional view of the pump bearing frame and monitoring device of FIG. 8B.

FIG. 7 is an enlarged view of mounting surface 104, according to an implementation. Mounting surface 104 may be positioned adjacent to recess 114 (not shown in FIG. 7.) As shown, for example, in FIG. 7, mounting surface 104 includes a substantially square perimeter with each of mounting holes 106 located near a different corner of the substantially square perimeter. According to an implementation, each of mounting holes 106 may be positioned within an area, A, which may include the intersecting 15 percent of length L (e.g., 0.15 L) along each side of the perimeter. For example, length L may be 3 inches (7.62 cm) and the distance W between the center of each mounting hole 106 in adjacent corners of mounting surface 104 may be 2.9 inches (7.37 cm). In other implementations, mounting surface 104 may include additional mounting holes (not shown) to accommodate different hole patterns for different types of monitoring devices 10.

FIGS. 8A-8D provide views of monitoring device 10 mounted in mounting pocket 102 of pump bearing frame 100, according to another implementation. In the configuration of FIGS. 8A-8D, the surface area of flat surface 104 (e.g., with at least 3-inch by 3-inch dimensions) cannot be achieved by only machining a side of pump bearing frame 100. For example, the radius of drive bearing portion 103 may be too small to achieve a flat surface 104 along horizontal centerline H while maintaining a required minimum side wall thickness of pump bearing frame 100. Accordingly, additional material may be added (e.g., during casting) to form portions 126 of pump bearing frame 100 that are later machined into flat surface 104. Thus, mounting pocket 102 may be formed from a combination of building up and removing side walls to form flat surface 104.

A mounting pocket is provided for attaching a monitoring device to a pump bearing frame. The pump bearing frame includes a substantially cylindrical drive bearing portion configured to house pump drive bearings. The mounting pocket includes a recessed area located on an external side of the pump bearing frame, a flat surface within the recessed area, and at least four threaded mounting holes extending into the flat surface. At least a part of the drive bearing portion has a reduced radial wall thickness adjacent the flat surface. The threaded mounting holes are configured to receive threaded bolts from the monitoring device to secure the flat surface against a rear surface of the monitoring device. The flat surface is configured to transfer at least one of vibration or thermal energy from the pump bearing frame through the flat surface to the monitoring device.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A pump bearing frame, comprising:
   a substantially cylindrical drive bearing portion configured to house pump drive bearings;
   a base;
   a drive end opposing a pump end and having a drive end flange; and
   a mounting pocket for a monitoring device that includes a hinged front cover, the mounting pocket having one side formed at least in part by the drive end flange, the mounting pocket including:
      a recessed area located on an outside of the pump bearing frame,
      a flat surface within the recessed area,
      a secondary recess adjoining the recessed area on one side of the recessed area opposite the drive end flange, and
      at least four threaded mounting holes extending into the flat surface,
   wherein at least a part of the drive bearing portion has a reduced radial wall thickness adjacent the flat surface,
   wherein the at least four threaded mounting holes receive threaded bolts from the monitoring device to secure the flat surface against a rear surface of the monitoring device,
   wherein the flat surface is in a vertical orientation on one side of the pump bearing frame when the pump bearing frame is positioned on the base,
   wherein the secondary recess accommodates a hinge of the monitoring device when the monitoring device is secured to the flat surface, and
   wherein the flat surface transfers at least one of vibration or thermal energy from the pump bearing frame through the flat surface to the monitoring device.

2. The pump bearing frame of claim 1, wherein the flat surface is located adjacent to the substantially cylindrical drive bearing portion of the pump bearing frame.

3. The pump bearing frame of claim 1, wherein dimensions of the flat surface are at least 3 inches by 3 inches.

4. The pump bearing frame of claim 1, wherein the flat surface is located on a horizontal centerline of the pump bearing frame.

5. The pump bearing frame of claim 1, wherein the reduced radial wall thickness is a minimum thickness along a horizontal centerline on the one side of the pump bearing frame.

6. The pump bearing frame of claim 1, wherein the mounting pocket is configured to receive the monitoring device in a single orientation.

7. The pump bearing frame of claim 1, wherein the pump bearing frame includes a cast metal, and wherein the flat surface is machined into the cast metal.

8. The pump bearing frame of claim 1, wherein the drive end flange forms a side wall of the recessed area, and
   wherein the secondary recess and the side wall form an indexing mechanism for orienting the monitoring device in the mounting pocket.

9. A system comprising:
   a monitoring device configured to be mounted to equipment and collect vibration and temperature data from the equipment, the monitoring device including front cover and a base portion connected by a hinge; and
   a pump bearing frame including base, a drive end opposing a pump end and having a drive end flange, and a mounting pocket for the monitoring device, the mounting pocket having one side formed at least in part by the drive end flange, the mounting pocket including:
      a recessed area located on an external side of the pump bearing frame;
      a flat surface within the recessed area;
      a secondary recess adjoining the recessed area on one side of the recessed area opposite the drive end flange; and
      at least four threaded mounting holes extending into the flat surface, wherein the at least four threaded mounting holes are arranged in a hole pattern that corresponds to a bolt pattern of the monitoring device,
   wherein the at least four threaded mounting holes receive threaded bolts from the monitoring device to secure the flat surface against a rear surface of the monitoring device,
   wherein the flat surface is in a vertical orientation on one side of the pump bearing frame when the pump bearing frame is positioned on the base,
   wherein the secondary recess accommodates a hinge of the monitoring device and permits opening of the front cover when the monitoring device is secured to the flat surface, and
   wherein the flat surface transfers at least one of vibration or thermal energy from the pump bearing frame through the flat surface to the monitoring device.

10. The system of claim 9, wherein the monitoring device includes a temperature sensor and a three-axis accelerometer.

11. The system of claim 9, wherein the flat surface is located adjacent to a drive bearing portion of the pump bearing frame, and wherein at least a portion of the drive bearing portion has a reduced wall thickness adjacent the flat surface.

12. The system of claim 9, wherein the dimensions of the flat surface are at least 3 inches by 3 inches.

13. The system of claim 9, wherein the flat surface intersects a horizontal centerline of the pump bearing frame.

14. The system of claim 9, wherein the mounting pocket is configured so that a particular orientation of the monitoring device is required to allow the base portion of the monitoring device to contact the flat surface.

15. The system of claim 9, wherein the pump bearing frame includes a cast metal, and wherein the flat surface is machined into the cast metal.

16. The system of claim 9, wherein the drive end flange forms a side wall of the recessed area, and
   wherein the secondary recess and the side wall form an indexing mechanism for orienting the monitoring device in the mounting pocket.

* * * * *